Aug. 29, 1939.  R. E. FRICKEY  2,170,859
METHOD OF REPAIRING RAIL ENDS
Original Filed May 8, 1936
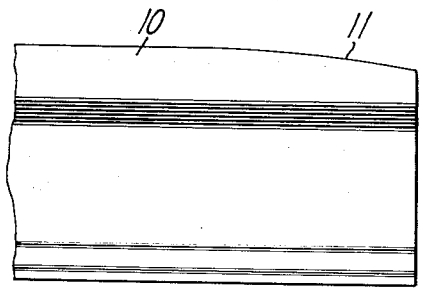
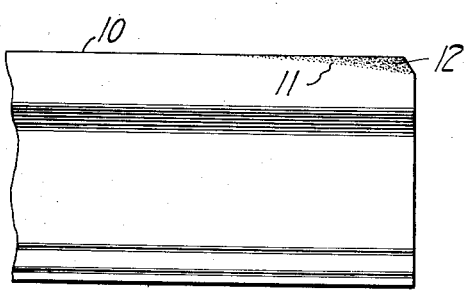
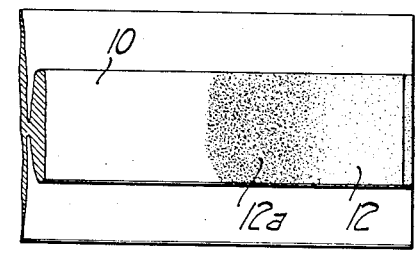
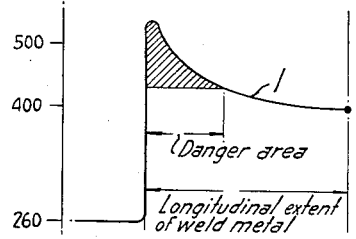
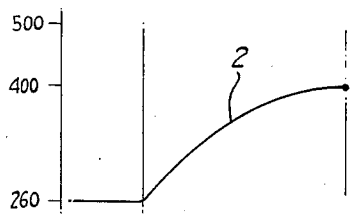
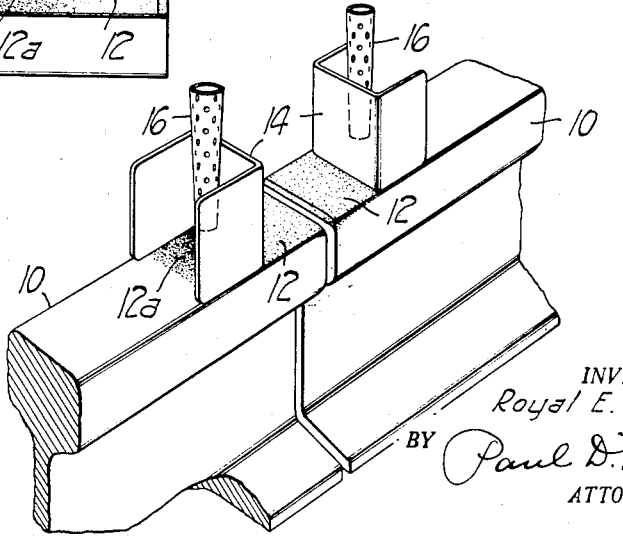
INVENTOR.
Royal E. Frickey
BY
ATTORNEY Patented Aug. 29, 1939

2,170,859

UNITED STATES PATENT OFFICE 2,170,859

METHOD OF REPAIRING RAIL ENDS

Royal E. Frickey, San Francisco, Calif., assignor to Welding Service, Inc., San Francisco, Calif., a corporation of California Application May 8, 1936, Serial No. 78,615
Renewed February 14, 1938

6 Claims. (Cl. 219—10)

This invention relates generally to the art of repairing railroad rails by applying weld metal to worn end portions of rail sections, to re-establish the tread surfaces.

Due to the pounding action of rolling stock upon rail ends, in passing over rail joints, the tread surfaces of the rail sections are gradually worn away over areas extending for a substantial distance from the center of the joint, as for example distances from three to eight inches. To properly preserve rail sections which have been subject to such wear, and to secure smooth movement of rolling stock over the joints, it has been common to build up the ends of the rail sections by application of weld metal, thereby re-establishing the tread surfaces. In such welding operations it is desirable to employ weld metal which will produce a surfacing considerably harder than the steel body of the rail, as for example a chromium manganese steel or a chromium nickel steel alloy. When using alloys of this character the fused weld metal is hardened by the rapid cooling, which takes place immediately following its application.

For a number of years I have checked a large number of joints repaired as described above. In certain instances I have found that they are defective in that they do not afford the type of long useful service expected. The defect to which I have reference first manifests itself by the appearance of small cracks extending across the layer of weld metal, in a zone spaced from the center of the joint. Following the appearance of such cracks the weld metal within this zone soon commences to break away, with the result that further chipping and spalling away of the metal requires that the rail be again repaired.

It is an object of the present invention to avoid the type of failure described above, and thus make possible joint repairs by welding operations which can be depended upon to give long useful service. The attaining of this object has been predicated upon my discovery that if no part of the weld metal layer has an excessive hardness, as for example 400 B. H. N., the initial cracking of weld metal will not occur. In the present invention I provide a procedure for preventing excessive hardness, but at the same time I provide ample hardness near the end of the rail, to withstand the battering action of rolling stock without material flow of metal.

Further objects of the invention will appear from the following description in which the preferred embodiment of the invention has been set forth in detail in conjunction with the accompanying drawing.

Referring to the drawing:

Fig. 1 is a side elevational view of a representative worn rail end.

Figs. 2 and 3 are plan and side elevational views respectively, showing a rail end to which weld metal has been applied.

Figs. 4 and 5 are hardness curves, serving to illustrate the effect of carrying out my method.

Fig. 6 is a perspective view of a rail joint, showing one step of my present method.

Referring first to Fig. 1 of the drawing, I have shown a rail section having its tread surface 10 worn away near the end of the rail, as indicated by numeral 11. To repair such a rail end I first proceed according to the method as specified in my Patent No. 1,889,780, granted Dec. 6, 1932, reissued November 26, 1935, as Reissue Patent No. 19,764. Briefly the end of the rail section is subjected to a preheating operation, and then weld metal is applied to build up the worn portion of the rail ball, by the use of an electric arc. Preheating is desirable in that it minimizes shock stresses, which are apt to occur if the rail section is too cold, and it also makes possible better penetration of heat to produce a hardened zone of substantial depth underlying the layer of weld metal, as described in said Letters Patent.

The welding rod employed should be of such a character that the weld metal produced hardens at the rate of cooling to which it is subjected, after completion of the welding operation. This self-hardening characteristic should be such that the weld metal at the end of the rail section, attains a hardness in the neighborhood of 400 B. H. N. This is substantially harder than standard rail sections (about 260 B. H. N.) and is less than a dangerously high degree of hardness which I estimate to be in the neighborhood of 475 or more. Many rods available on the market will give this result, including rods having a mild steel core with a coating containing chromium and manganese, and rods having a nickel steel core with a coating containing chromium.

The end portion of a rail section, after a welding operation as described above, is illustrated in Figs. 2 and 3. The tread surface of the rail has been re-established by the layer of weld metal 12, and this layer extends for a substantial distance back from the end of the rail. If now the hardness of such a layer is determined at different points along its length, it will be found in most instances that the hardness varies at different parts. Near the end of the rail section, the hardness may be about 400, which has been found capable of withstanding the pounding of rolling stock, without breakage, and without serious flow of metal. However a zone 12a will be found adjacent the other end of the layer, which the weld metal is of extreme hardness, as for example a hardness value of 500 or more.

Fig. 4 illustrates a representative hardness curve 1, plotted by taking successive tests of the hardness of the weld metal, along the length of the layer. It will be noted that while this curve starts at a hardness of about 400 at the end of the rail section, it increases to a peak above a value of 500, where the other end of the layer merges with the metal of the rail ball. If this hardness pattern has been observed by others in the past, it has not been accorded any particular significance, and it has been assumed that excessive hardness over a zone remote from the end of the rail, could cause no harm. However, I have definitely determined that this area of excessive hardness is a danger zone, and that its detrimental effects can be alleviated by reducing its hardness to a safe value, as for example below a value of 450. In Fig. 4 the danger zone just described has been indicated by shading a certain area of the curve, and in carrying out the present invention I avoid a hardness curve which includes such a shaded area.

The next step of my method consists in differentially tempering or drawing the layer of weld metal, so that the danger zone of excessive hardness is eliminated, while the hardness of the weld metal near the end of the rail, remains the same. This operation can be carried out as indicated in Fig. 6. A pair of crucibles 14 are shown, which can be seated upon the rail, and extending into the crucibles are the blow torches 16. The crucibles 14 confine the flame of the blow torches, to avoid material heating of those portions of the weld metal layers, near the center of the joint. The areas of excessive hardness are heated in this manner, until a temperature is attained corresponding to quick blue heat. By quick blue heat I have reference to a temperature such that when the surface of the metal is scratched with a file, it will immediately return to a dark blue color.

Differential drawing or tempering of the excessively hard portions of weld metal as described above, serves to reduce the hardness of these portions to a safe value below 450. With optimum carrying out of the method a hardness curve 2 as illustrated in Fig. 5, will be produced, in which the hardness of the layer of weld metal gradually diminishes from a value of about 400 at the tip of the rail to a value of about 260 corresponding to that of standard rail sections, at the other end of the layer.

Rail ends repaired as described above will afford long useful service without failure. The tempered zone of weld metal, even though relatively thin, will not crack, and therefore the serious consequences of cracking within this zone, are avoided.

It is evident that the procedure specified can be modified in certain respects, within the scope of the appended claims. For example in some instances general preheating can be omitted, where the rail is not initially at a low temperature, and differential drawing as specified above is being practiced. Also in place of drawing by heating only the danger zone of the weld metal, it is possible to differentially preheat, and to rely upon residual heat after welding, to the desired drawing operation. Thus in preheating the rail sections, apparatus such as shown in Fig. 6 can be employed whereby heat is applied at areas spaced from the ends of the rails. When the areas being heated attain a suitable temperature, as for example 800° F., the metal at the ends of the rail sections will be at a materially lower temperature. After applying the weld metal some of the heat from the preheating operation is retained to modify the rate of cooling of the weld metal, and this modification will suffice to prevent undue hardness in the danger zone previously described, without however causing the weld metal at the ends to be unduly softened.

I claim:

1. In a method of repairing rail ends with weld metal, differentially preheating an end portion of the rail whereby a localized area of the rail surface spaced from the tip of the rail receives more heat than the tip of the rail, applying the weld metal to the end portion of the rail, on the upper surface of the rail ball, to form a layer of weld metal extending longitudinally of the rail, and then utilizing heat to temper a portion of the layer remote from the tip of the rail without tempering the weld metal at the tip of the rail to a comparable degree, thereby avoiding a danger zone of excessive hardness, said heat being residual heat resulting to a substantial degree from said preheating operation.

2. In a method of repairing rail ends with weld metal, applying weld metal to the end portion of the rail, on the upper surface of the rail ball, to form a layer of weld metal extending for a substantial distance longitudinally of the rail, the weld metal being of such a character that after its application it attains a hardness substantially greater than the metal of which the rail is made, and then applying heat to only a portion of the facing remote from the tip of the rail, to temper the same.

3. In a method of repairing rail ends with weld metal, applying weld metal by an electric arc to the end portion of the rail, on the upper surface of the rail ball, to form a facing of weld metal extending for a substantial distance longitudinally of the rail, the weld metal being of such a character that when permitted to cool it attains a hardness substantially greater than the hardness of the body of the rail, and then tempering a portion of the facing removed from the tip of the rail, without undue softening of that portion of the facing adjacent the rail tip.

4. In a method of repairing rail ends with weld metal, preheating the rail, applying weld metal by an electric arc to the heated end portion of the rail, on the upper surface of the rail ball, to form a facing of weld metal extending for a substantial distance longitudinally of the rail, and then applying heat to only a portion of the facing removed from the tip of the rail, to temper the same.

5. In a method of repairing worn rail ends with weld metal, differentially preheating an end portion of the rail by applying heat to a localized area of the rail surface spaced from the adjacent tip of the rail, immediately thereafter applying fused weld metal to the upper face of the rail to restore the tread surface of the same, said weld metal being applied over a zone of the rail ball extending from the rail tip into said localized area, permitting the weld metal to cool and making use of residual heat from the preheating step to effect tempering of weld metal applied to said localized area without causing tempering of the weld metal at the tip of the rail to a detrimental degree, thereby avoiding a danger zone of excessive hardness.

6. In a method of repairing rail ends with weld metal, applying the weld metal to the end portion of the rail on the upper face of the rail ball, to form a layer of weld metal extending longitudinally of the rail, said weld metal being such that as applied to the rail by an electrical arc, it will afford by self chilling an ultimate hardness of the order of 400 Brinell at the tip of the rail and a hardness of the order of 475 Brinell or more adjacent that end of the layer remote from the tip of the rail, and then, following application of the weld metal, causing differential tempering of the layer whereby the ultimate hardness of the weld metal at the tip of the rail is of the order of 400 Brinell, while the hardness of that portion of the layer extending back from the tip of the rail is substantially less than 450 Brinell but not less than the hardness of the untreated rail metal.

ROYAL E. FRICKEY.